April 17, 1962 B. P. LAYNE 3,029,932
RE-USABLE PROTECTIVE COATING AND STRIPPING DEVICE
Filed Sept. 23, 1957
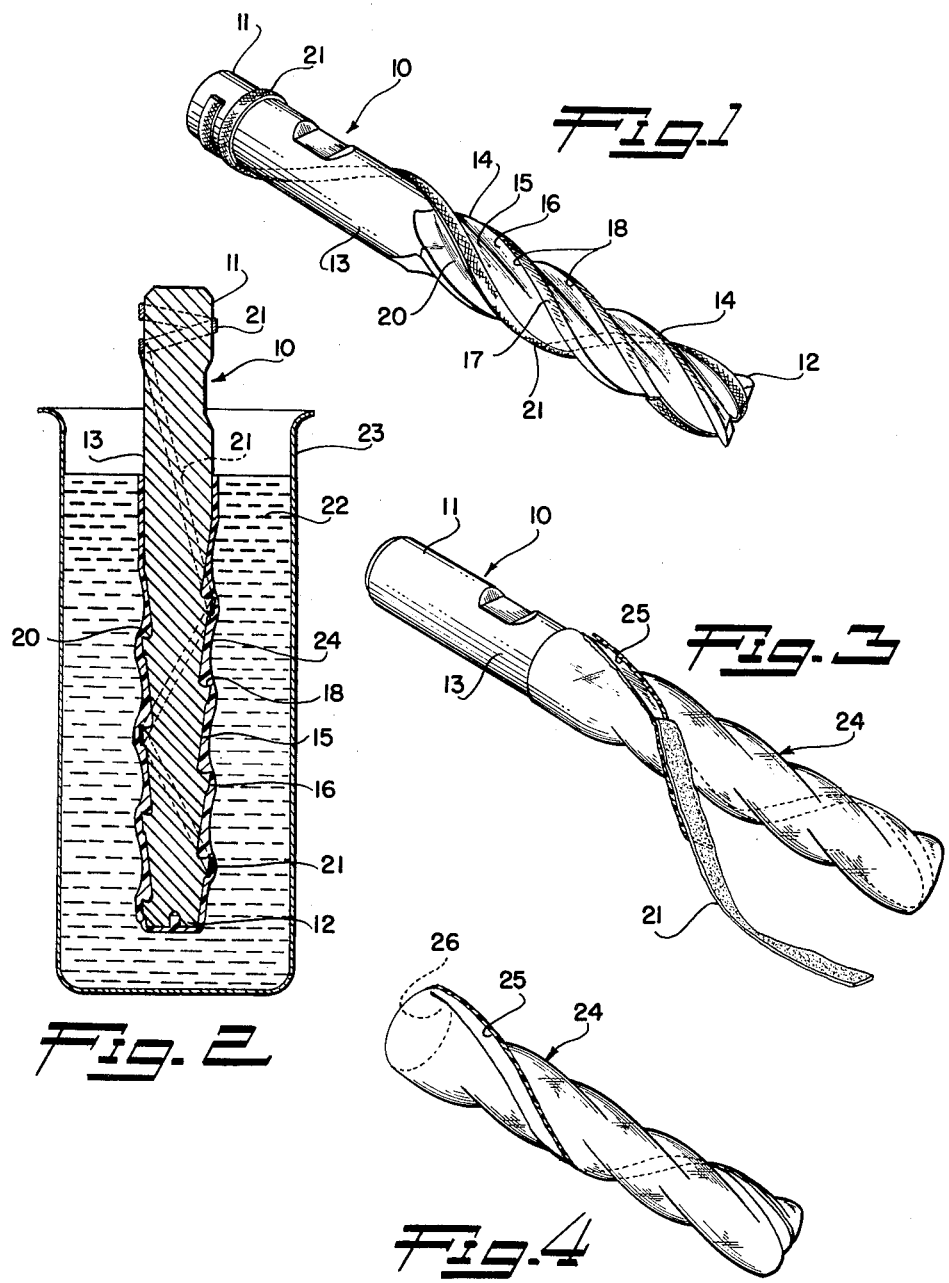
INVENTOR.
BYRON P. LAYNE
BY
*R. E. Geauque*
Attorney

United States Patent Office 3,029,932
Patented Apr. 17, 1962

1

3,029,932
RE-USABLE PROTECTIVE COATING AND STRIPPING DEVICE
Byron P. Layne, 666 Rosemary Lane, Burbank, Calif.
Filed Sept. 23, 1957, Ser. No. 685,481
6 Claims. (Cl. 206—46)

This invention relates to the protective packaging of articles in plastic coating, or the like, and more particularly to improvements in protective coating wherein the coating may be easily removed from the article and re-used at a later time.

In the packaging industry, as well as others, it is common practice to apply removable coating compositions directly to articles requiring protection against atmospheric conditions or against any other harmful conditions, such as from abrasion and ordinary wear and tear encountered in transit or in storage. Generally, coatings of plastic composition have been found desirable because this composition clings to the article and isolates delicate portions thereof from the surrounding atmosphere and also serves as a cushion or buffer to protect the article and absorb shocks if inadvertently dropped or mishandled. For example, it is the conventional practice in the machine tool field to submerge precision instruments such as drills into a dip-tank containing soluble plastic materials. Upon emergence of the tool from the plastic solution, the plastic solidifies to form a protective coating which is not injurious to the tool and which may be readily removed from the tool.

However, difficulties are encountered when employing the conventional plastic coatings to protect precision tools which stem largely from the fact that removal of the coating by a workman is difficult and the workman's fingers are often injured by the sharp edges or points of the tool during removal of the coating. Also, the tool may inadvertently be dropped to a hard surface, such as the floor, and damaged because of the difficulty in removing the coating. If the workman uses a special tool to strip the protective coating from the drill, it sometimes happens that the special removal tool forcibly engages precision formed parts of the coated tool, such as cutting edges, and thereby damages the precision tool for further use. Once the protective coating has been stripped from the tool, the individual pieces of protective coating are usually thrown away since the original configuration of the coating has been destroyed.

These difficulties are overcome in accordance with the present invention wherein a stripping ribbon having an adhesive surface is applied to an article, such as a precision tool, in a spiral fashion extending substantially along the full length of the article. The article, after being dipped into a soluble material, such as liquid plastic contained in a dip-tank, will be coated with plastic material about the adhesive ribbon and tool and the material will solidify in the surrounding atmosphere to form a protective coating. Construction in this manner allows the spiral ribbon to be pulled from the body of the article to cut through the plastic protective coating and thereby leave a spiral gap in the coating. In order to remove the article from the protective coating, it is only necessary to rotate the article in the coating in a screw and nut fashion until the tool is separated from the coating. Inasmuch as the only portion of the original protective coating which has been disturbed is that portion forming a spiral gap, the removed protective coating forms a one-piece jacket into which the tool may be inserted and removed many times over.

A feature of the present invention resides in the fact that the stripping ribbon is provided with an adhesive coating which causes the ribbon to adhere to the surface of the article so that upon immersion into a liquid, the natural buoyancy of the ribbon will not cause the ribbon to leave its predetermined position on the tool and float to the surface of the liquid.

Another feature of the present invention is to provide a protective coating for an article which, when removed from the article may be readily acceptable for additional uses as a protective coating for the same atricle.

Still a further object of the present invention is to provide a reusable protective coating for an article which, when initially stripped from the article will remain substantially intact with only a slight spiral tear or gap present in the reusable form.

Still another object of the present invention is to provide a reusable protective coating for an article having spiral convolutions or deep gullets or other configurations whereby the protective coating when initially removed from the article can be re-used many times over.

These and other objects will be more clearly seen upon a reading of the specification when taken in connection with the accompanying drawings wherein:

FIGURE 1 is a perspective view of an article provided with an adhesive stripping of ribbon in accordance with the present invention prior to being coated with a protective jacket;

FIGURE 2 is a section of the article, including the ribbon of FIGURE 1 being submerged into a liquid and showing the collection of the liquid about the submerged portion of the article.

FIGURE 3 is a perspective view of the article, the stripping ribbon and protective jacket illustrating the procedure in initially removing the protective jacket from the article; and FIGURE 4 is a perspective view of the protective jacket after it has been removed from the article.

With respect to FIGURE 1, an article of manufacture is shown which for illustrative purposes takes the form of a machine tool end mill cutter 10. This tool is generally a precision cutter having a head 11 on one end and a tip 12 on the opposite end separated by a common shank 13. Such tools are usually composed of hard steel alloy and are provided with a plurality of spiral ridges, such as a ridge 14. Each ridge is defined by a semi-round wall 15 and a flat wall 16 extending outwardly of the body 13 and terminating jointly in a flat spiralled surface 17 having a cutting edge 18 following the spiral curve of ridge 14. Adjacent the spiral ridges, there are defined several spiral convolutions, such as spiral convolution 20, which form relatively deep gullets in the shank of the drill.

With respect to FIGURE 2, the tool 10 having been prepared with adhesive ribbon 21 is shown submerged into a fluid, such as a plastic vinyl composition, contained within a dip-tank 23. Because of the relative cool temperature of the tool, the plastic material commences to cling to the surfaces of the submerged portion of the tool including the outer surface of the ribbon 21 as represented by the cross-hatched portion of the submerged tool. The coating material collects about the cutter in a rather uneven distribution due to the fact that the spiral convolutions represent intermittent gullets which are generally formed deeper within the shank 13 than other portions of the convolution. A feature resides in the fact that the ribbon 21 adheres to the surface of the tool so that its natural buoyancy will not cause the ribbon to disengage from its position on the tool and float to the surface of the liquid in the tank.

In reference to FIGURE 3, the tool shown in FIGURE 2 has been emerged from solution 22 and the protective material has solidified in the atmosphere to form a protective jacket or coating 24 about the spiral ridges including the cutting edges of the tool. In order to effect removal of the jacket 24 from the drill, the end of ribbon 21 wrapped around head 11 may be pulled from head 11 by manual pressure. As the pulling of ribbon 21 proceeds, the protective jacket 24 is torn to provide a spiral gap 25 following the removal of the ribbon 21. When ribbon 21 has been detached from the tool 10, the tool may be merely twisted or rotated to disengage the tool from jacket 24 in a nut and screw fashion.

FIGURE 4 shows the jacket 24, as removed from tool 10, which may be re-used at a later time to protect the cutting edges of the tool 10. The tool may be easily inserted into an opening 26 provided during the initial removal of the tool and twisted in a screw and nut fashion until the tool tip 12 bottoms within opening 26 of the jacket. It is to be noted that the jacket is provided with identical convolutions and ridges as provided in the article from which it has been removed.

Therefore, it can be seen that the present invention provides a re-usable protective coating for an article which may be readily stripped from the article to form a one-piece jacket suitable for re-use at a subsequent time. Since the adhesive ribbon is located on one of the ridges, the thickness of coating torn by the ribbon is a minimum. The strength requirement for the ribbon will, of course, be determined by the thickness and composition of coating to be torn by the ribbon. Various modifications are contemplated by those skilled in the art without departing from the spirit and scope of the invention hereinafter defined by the appended claims.

What is claimed is:

1. The method of temporarily protecting a contoured surface of an article having an uneven configuration comprising, affixing a ribbon having a pressure sensitive adhesive to the contoured surface of the article generally following the article surface of maximum elevation, coating a portion of the article including a portion of the ribbon with a material of soft resilient composition, removing the uncoated portion of the ribbon from the article by manual pressure, and tearing the coating to define a gap in the coating by the continued removal of the ribbon from the surface of the article where the ribbon has torn the coating, and twisting the article to break free from the coating leaving the coating intact except for the gap formed therein in substantially the same configuration as the article.

2. The method of providing a re-usable and temporary protective coating for a contoured surface of an article of uneven contour comprising, adhering a pressure sensitive coated ribbon to the surface of the article of maximum elevation, applying a coating of relatively soft and resilient composition to a portion of the article and a portion of the ribbon, removing the uncoated portion of the ribbon from the uncoated portion of the article, tearing the coating by continued removal of the ribbon from the surface of the coated portion of the article so that minimum coating thickness is removed, and twisting the article with respect to the coating which breaks the coating away from the surface of the article leaving the coating intact in substantially the same configuration as the article.

3. The method of temporarily protecting a cutting surface of a tool of uneven contour with a material of soft resilient composition which comprises, affixing a ribbon having a pressure sensitive adhesive to the raised cutting surfaces of the tool in a continuous helical fashion extending from the cutting end of the tool by affixing the ribbon over the last mentioned end and then rearward in helical fashion toward the first mentioned end, applying a continuous coating of the composition in fluid form to the cutting portion of the tool including a portion of the ribbon, allowing the composition to dry in the surrounding atmosphere which provides a continuous coating of soft and resilient composition, removing the uncoated portion of the ribbon from the uncoated portion of the tool by manual pressure, and tearing the dried coating by continuous and complete removal of the ribbon from the coated portion of the tool which forms a helical tear in the coating, while leaving the ribbon attached to the coating at one end.

4. The method of temporarily protecting the contoured surface of an article of irregular contour, which comprises, adhering a pressure sensitive adhesive ribbon to the contoured surface of the article in a helical fashion extending from one end of the article to its opposite end, submerging a portion of the article including ribbon into a fluid composition whereby the composition clings to the surface of the article, removing the partially submerged article from the fluid composition, drying the composition clinging to the contoured surface of the article to provide a relatively soft and resilient protective coating, removing the uncoated portion of the ribbon from the uncoated portion of the article, tearing the coating by continued removal of the ribbon from the surface of the coated portion of the article to form a helical tear exposing the surface of the article beneath the ribbon, and twisting the article with respect to the coating for breaking the coating away from the contoured surface of the article.

5. A removable protective coating for an article of uneven configuration comprising, an adhesive ribbon secured to the periphery of the article to form a helix extending from one end of the article to its opposite end, a protective coating of soft and resilient composition covering a portion of the article including a portion of the ribbon, and a portion of the ribbon exposed from the protective coating to form a pull tab whereby the protective coating is removed from the article.

6. The invention as defined in claim 5 wherein the coating when removed from the article includes a helical gap extending the full length of the coating and a central bore to receive the article upon insertion therein.

References Cited in the file of this patent

UNITED STATES PATENTS

| | | |
|---|---|---|
| 1,936,417 | Ware | Nov. 21, 1933 |
| 1,994,468 | Freeman | Mar. 19, 1935 |
| 2,141,252 | Prindle | Dec. 27, 1938 |
| 2,333,887 | Redlinger | Nov. 9, 1943 |
| 2,372,982 | Richards et al. | Apr. 3, 1945 |
| 2,394,101 | Phillips et al. | Feb. 5, 1946 |
| 2,646,837 | Brandenburg et al. | July 28, 1953 |
| 2,739,699 | Blum | Mar. 27, 1956 |
| 2,793,126 | Fienup et al. | May 21, 1957 |
| 2,793,127 | Geist et al. | May 21, 1957 |
| 2,795,366 | Magill | June 11, 1957 |
| 2,802,595 | Veitch | Aug. 13, 1957 |

FOREIGN PATENTS

| | | |
|---|---|---|
| 193,263 | Great Britain | Feb. 22, 1923 |

OTHER REFERENCES

"Finish," March 1955, page 48.